UNITED STATES PATENT OFFICE.

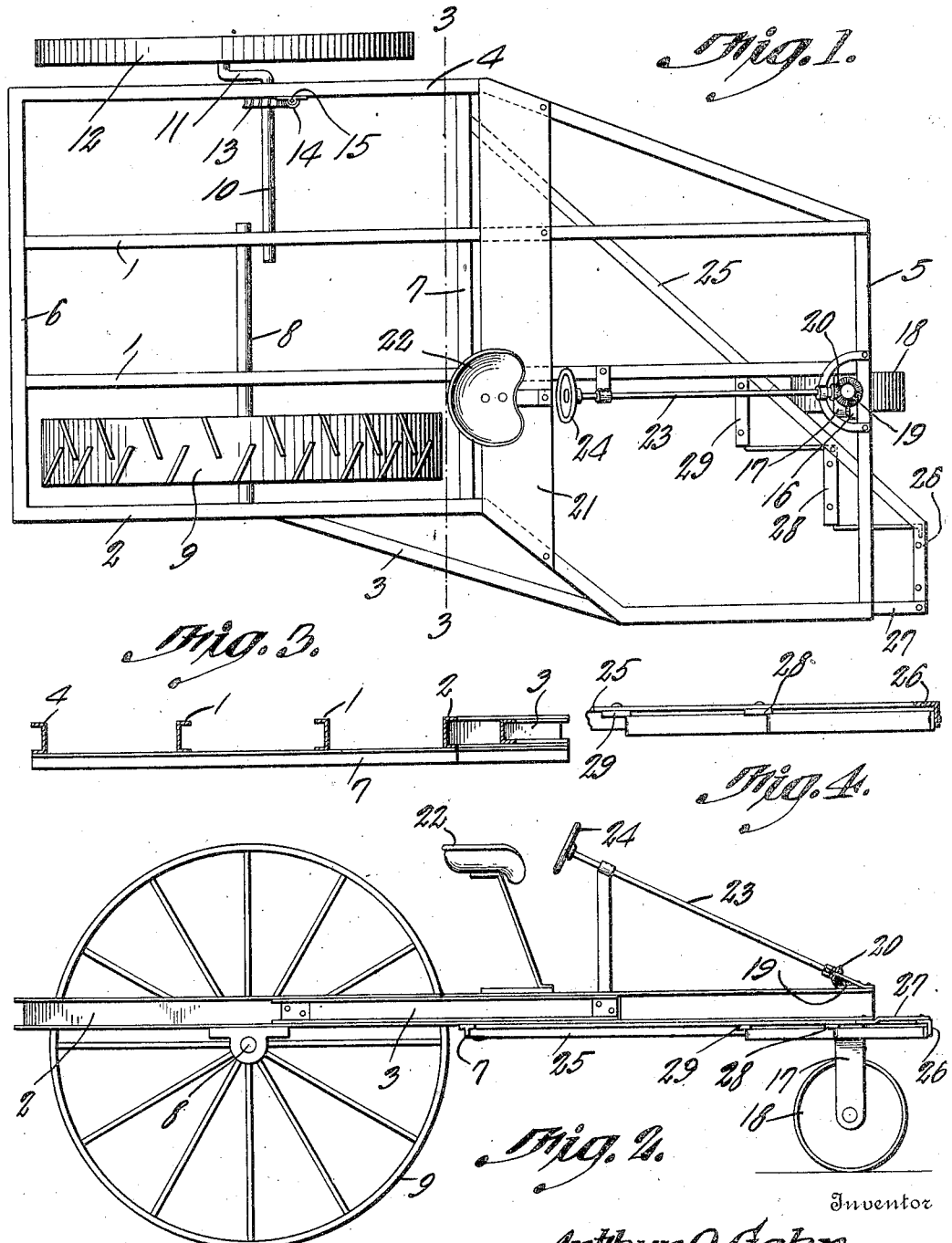

ARTHUR O. GAHR, OF MILBANK, SOUTH DAKOTA.

FRAME FOR AGRICULTURAL IMPLEMENTS.

1,103,924.  Specification of Letters Patent.  Patented July 14, 1914.

Application filed May 19, 1913, Serial No. 768,686. Renewed May 10, 1914. Serial No. 839,055.

*To all whom it may concern:*

Be it known that I, ARTHUR O. GAHR, a citizen of the United States, residing at Milbank, in the county of Grant and State of South Dakota, have invented certain new and useful Improvements in Frames for Agricultural Implements, of which the following is a description.

This invention has relation to frames for agricultural implements, and it consists in the novel features hereinafter described and claimed.

An object of the invention is to provide a strong and durable frame especially adapted to be used for agricultural purposes.

This frame is so constructed that it may conveniently support a propelling motor, and the frame is supported upon wheels to one of which the motor may be operatively connected. Implements such as plow beams, cultivators, harrows, scrapers, graders, etc., may be connected with the frame and the frame is so constructed as to withstand the strains to which it is subjected when the said implements are being forced through the soil, or over the surface thereof.

With these and other objects in view, the invention consists in certain novel constructions, combinations, and arrangements of the parts as will be hereinafter fully described, and then specifically pointed out in the claims.

In the accompanying drawing: Figure 1 is a top plan view of the frame; Fig. 2 is a side elevation thereof; the remaining figures are details of the several parts thereof.

The frame comprises two parallel beams 1 which are cut from sections of channel iron. The frame also includes a side beam 2 which is provided with offset end portions, the beam 2 also being of channel iron. A brace 3 is connected to the beam 2, and is adapted to sustain the end portions of the said beam in offset relation to each other. The frame further includes a side beam 4, also of channel iron, and this beam is provided with angularly disposed end portions. The rear portions of all of the said beams are parallel while the forward portion of the beam 4 converges toward the nearer beam 1, and is bolted to the said beam 1 in the vicinity of the forward end thereof. The forward ends of the beams 1 and 2 are connected together by a front cross beam 5, and the rear ends of all of the beams are connected together by a cross beam 6. These cross beams are also of channel iron. A T-beam 7 lies transversely across the intermediate portions of the beams 1, 2 and 4, and is connected with the said beams in any suitable manner. An axle 8 is journaled above the beams 1 and 2, and may be connected in any suitable manner with a motor not shown. A traction wheel 9 is fixed to the axle 8, and is located between the beams 1 and the side beams 2. An axle 10 is journaled below the beams 1 and 4, and is provided with a crank end 11 upon which is journaled a ground wheel 12. A worm wheel 13 is fixed to the axle 10, and a worm 14 engages the said worm wheel. The worm 14 is carried by a shaft 15 which is journaled to the side of the beam 4. Therefore it will be seen that by rotating the shaft 15, the worm 14 through the worm wheel 13, will rotate or partially rotate the axle 10, whereby the ground wheel 12 is raised or lowered, with relation to the frame. The traction wheel 9 is of greater diameter than the ground wheel 12 and the vertical movement provided for the ground wheel 12 makes it possible to maintain the frame approximately level when the traction wheel 9 is running in a furrow in the ground, and the ground wheel 12 is upon the surface of the soil. A block 16 is fixed to the inner side of the cross beam 5 at a point between the ends thereof. A frame 17 is journaled in the block 16 and a wheel 18 is journaled in the frame 17. A worm wheel 19 is fixed to the shaft of the frame 17, and a worm 20 engages the worm wheel 19. A platform 21 is mounted upon the frame of which the beams 1, 2 and 4 are components, and an operator's seat 22 is mounted upon the said platform. A shaft 23 is fixed to the worm 20, and extends back toward the seat 22, and is provided with a hand wheel 24, which is within reach of one occupying the seat 22. Therefore it will be seen that as the traction wheel 9 is rotated, the frame will be moved over the ground and by turning the shaft 23, the worm 20, and worm wheel 19 will turn the frame 17 so that the wheel 18 is steered or guided.

An obliquely disposed beam 25 is connected at its rear end to the T beam 7, and extends under the forward portions of the beams 1, and under the intermediate portion of the beam 5, and projects in front of the same. A section 26 is attached to the forward end of the beam 25 and is located in front of the beam 5, and is braced against the same by means of struts 27. Other sections 28 and 29 are carried by the beam 25, and are braced in any suitable manner with relation to the said beam. The sections 26, 28 and 29 are parallel with each other, but the end portions of the said sections do not overlap each other in a direction longitudinally of the frame. It is to these sections that the plow beams, cultivator beams, harrows or other implements may be connected in any suitable manner.

As the frame is moved over the surface of the ground, the beams 1, 2 and 4 will sustain most of the thrust strain, inasmuch as the beam 25 is directly connected with the beams 1, and indirectly with the beams 2 and 4, through the beam 7 and strut 27. In view of the fact that the beam 25 is located in advance of the propelling wheel 9, and extends across the path of the same, and carries the soil-engaging members, it will have a tendency by reason of its disposition, to distribute the side thrust or strain so that the said strains are eventually applied to the propelling wheel in lines parallel with the vertical plane of the said wheel. Therefore it will be seen that a substantial and durable frame is provided and that the frame may be used for connecting various kinds of soil-engaging members when they are operating in the ground.

Having thus described the invention, what is claimed is:

1. A frame comprising parallel intermediate beams and side beams, one of the side beams having offset end portions, a brace extending between the said offset end portions, the other side beam having angularly disposed end portions, the forward end of the last-mentioned side beam being connected to one of the intermediate beams, a front cross beam connecting the intermediate beams and the first-mentioned side beam together, a rear cross beam connecting the ends of the intermediate beams and side beams together, an intermediate cross beam connecting all of the first-mentioned beams together, a propelling wheel journaled behind the intermediate cross beam, a ground wheel journaled behind the intermediate cross beam, a dirigible wheel journaled below the front cross beam and an obliquely disposed beam carried in front of the propelling wheel and extending across the path thereof and parallel sections attached to the said obliquely disposed beam.

2. A frame comprising parallel intermediate beams, a side beam having offset end portions, a brace connected with the offset end portions of said side beam, a second side beam having angularly disposed end portions, one end of the last-mentioned side beam being connected with one of the intermediate beams, a rear cross beam connecting all of the beams together, an intermediate cross beam connecting all of the beams together, a front beam connecting the first-mentioned intermediate beams and the side beam having offset ends, together, a propelling wheel journaled between the first-mentioned intermediate beams and the side beam having offset ends, said propelling wheel being located between the rear cross beam and the intermediate cross beam, a ground wheel journaled between the rear beam and the intermediate cross beam, means for raising and lowering the ground wheel, a dirigible wheel journaled below the front cross beam, an obliquely disposed beam connected at its rear end with the intermediate cross beam and lying under the front beam and the first-mentioned intermediate beams, and connected to the same, said obliquely disposed beam extending across the path of the propelling wheel and having its forward end projecting in front of the front beam, a strut interposed between the forward end of the obliquely disposed beam and the front beam, and parallel sections carried by the obliquely disposed beam.

In testimony whereof I affix my signature, in the presence of two witnesses.

ARTHUR O. GAHR.

Witnesses:
O. B. OSMONDSON,
G. L. WOOD.

---

Copies of this patent may be obtained for five cents each, by addressing the "Commissioner of Patents, Washington, D. C."